US009542426B2

United States Patent
Shau

(10) Patent No.: US 9,542,426 B2
(45) Date of Patent: Jan. 10, 2017

(54) MEMORY MANAGEMENT FOR IN-MEMORY PROCESSING COMPUTING ENVIRONMENTS AND SYSTEMS

(71) Applicant: TERADATA US, INC., Dayton, OH (US)

(72) Inventor: James Shau, Saratoga, CA (US)

(73) Assignee: Teradata US, Inc., Dayton, OH (US)

( * ) Notice: Subject to any disclaimer, the term of this patent is extended or adjusted under 35 U.S.C. 154(b) by 314 days.

(21) Appl. No.: 14/095,551

(22) Filed: Dec. 3, 2013

(65) Prior Publication Data
US 2014/0281303 A1 Sep. 18, 2014

Related U.S. Application Data

(60) Provisional application No. 61/788,467, filed on Mar. 15, 2013.

(51) Int. Cl.
*G06F 17/30* (2006.01)
(52) U.S. Cl.
CPC .............. *G06F 17/30321* (2013.01)

(58) Field of Classification Search
None
See application file for complete search history.

(56) References Cited

U.S. PATENT DOCUMENTS 8,874,620 B1 * 10/2014 Rohr ...................... G06F 17/30
707/803

* cited by examiner

*Primary Examiner* — Denise Tran
(74) *Attorney, Agent, or Firm* — Ramin Mahboubian

(57) ABSTRACT

Data can be stored in a memory for an in-memory processing system such the data is available for processing as soon as it is needed to be processed. A first portion and a second portion of the data can be stored in the memory of the in-memory processing system for processing by the in-memory processing system, such that the second portion of the data is stored in the memory before the in-memory processing system completes the processing of the first portion of the data, thereby allowing the in-memory processing system to process the second portion of the data when the processing system is able to process the second portion of the data.

12 Claims, 13 Drawing Sheets

MEMORY MANAGEMENT FOR IN-MEMORY PROCESSING COMPUTING ENVIRONMENTS AND SYSTEMS

CROSS-REFERENCE TO RELATED PATENT APPLICATIONS

This application takes priority from the Provisional U.S. Patent Application No. 61/788,467, entitled: "HASH-ORDERED EXECUTION" filed on Mar. 15, 2013, which is hereby incorporated by reference herein.

BACKGROUND

Data can be an abstract term. In the context of computing environments and systems, data can generally encompass all forms of information storable in a computer readable medium (e.g., memory, hard disk). Data, and in particular, one or more instances of data can also be referred to as one or more data objects. It is generally known in the art that a data object can, for example, be an actual instance of data, a class, a type, or a particular form of data, and so on.

Generally, storing and processing data are important aspects of computing systems and environments. Today, there is an ever increasing need to manage storage and processing of data in computing environments.

Data can be stored in memory. Memory is an important aspect of computing and computing systems. Memory can be volatile (e.g., Random Access Memory (RAM)) or non-volatile (e.g., flash memory). Generally, Volatile memory requires power to maintain the stored information, whereas non-volatile memory does not need power to maintain the stored information. Today, both volatile and non-volatile forms of memory are extensively used in various types and in numerous devices.

Databases provide a very good example of a computing environment or system where the storage and processing of data can be crucial. As such, to provide an example, databases are discussed below in greater detail.

The term database can also refer to a collection of data and/or data structures typically stored in a digital form. Data can be stored in a database for various reasons and to serve various entities or "users." Generally, data stored in the database can be used by one or more "database users." A user of a database can, for example, be a person, a database administrator, a computer application designed to interact with a database, etc. A very simple database or database system can, for example, be provided on a Personal Computer (PC) by storing data (e.g., contact information) on a Hard Disk and executing a computer program that allows access to the data. The executable computer program can be referred to as a database program, or a database management program. The executable computer program can, for example, retrieve and display data (e.g., a list of names with their phone numbers) based on a request submitted by a person (e.g., show me the phone numbers of all my friends in Ohio).

Generally, database systems are much more complex than the example noted above. In addition, databases have been evolved over the years and are used in various business and organizations (e.g., banks, retail stores, governmental agencies, universities). Today, databases can be very complex. Some databases can support several users simultaneously and allow them to make very complex queries (e.g., give me the names of all customers under the age of thirty five (35) in Ohio that have bought all the items in a given list of items in the past month and also have bought a ticket for a baseball game and purchased a baseball hat in the past 10 years).

Typically, a Database Manager (DBM) or a Database Management System (DBMS) is provided for relatively large and/or complex databases. As known in the art, a DBMS can effectively manage the database or data stored in a database, and serve as an interface for the users of the database. For example, a DBMS can be provided as an executable computer program (or software) product as is also known in the art.

It should also be noted that a database can be organized in accordance with a Data Model. Some notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation Language, and a Query Language.

Today, databases have become prevalent in virtually all aspects of business and personal life. Moreover, usage of various forms of databases is likely to continue to grow even more rapidly and widely across all aspects of commerce, social and personal activities. Generally, databases and DBMS that manage them can be very large and extremely complex partly in order to support an ever increasing need to store data and analyze data. Typically, larger databases are used by larger organizations. Larger databases are supported by a relatively large amount of capacity, including computing capacity (e.g., processor and memory) to allow them to perform many tasks and/or complex tasks effectively at the same time (or in parallel). On the other hand, smaller databases systems are also available today and can be used by smaller organizations. In contrast to larger databases, smaller databases can operate with less capacity.

A currently popular type of database is the relational database with a Relational Database Management System (RDBMS), which can include relational tables (also referred to as relations) made up of rows and columns (also referred to as tuples and attributes). In a relational database, each row represents an occurrence of an entity defined by a table, with an entity, for example, being a person, place, thing, or another object about which the table includes information.

Other types of databases that are not relational at least in the traditional sense or use an Alternative Data Processing (ADP) have been more recently developed. Alternate Data Processing can generally refer to the ability to issue a request (e.g., query) against data that does not necessarily conform to the Relational Model employed by databases. Such data could, for example, be semi-structured (Key, Value pairs), pure text, encoded sensor data etc. and the processing operations conducted against it might be relational, procedural, functional, mapper or reducer based (Map Reduce is a technique that can be applied to this type of alternate data to essentially turn it into a result set form by mapping input data against some pre-determined structure and reducing the resulting output to a final set by applying a selection algorithm). Two examples of these Alternate Data Processing (ADP) environments are Aster Data and Hadoop based environment as generally known in the art, where Aster Data can combine a parallel database approach as a means to store the data with a SQL wrapped Map Reduce capability (SQL-MR) provide for ADP, and Hadoop can combine a distributed file system with a Map Reduce framework to provide for ADP.

However, despite their different uses, applications, and workload characteristics, most systems can run on a common Database Management System (DBMS) using a standard database programming language, such as Structured Query Language (SQL). Most modern DBMS implementations (e.g., Oracle, IBM DBb2, Microsoft SQL, Sybase, MySQL, PostgreSQL, Ingress, etc.) are implemented on relational databases, which are well known to those skilled in the art.

Typically, a DBMS has a client side where applications or users submit their queries and a server side that executes the queries. On the server side, most enterprises employ one or more general-purpose servers. However, although these platforms are flexible, general-purpose servers are not optimized for many enterprise database applications. In a general purpose database server, all SQL queries and transactions are eventually mapped to low level software instructions called assembly instructions, which are then executed on a general purpose microprocessor (CPU). The CPU executes the instructions, and its logic is busy as long as the operand data are available, either in the register file or on-chip cache. To extract more parallelism from the assembly code and keep the CPU pipeline busy, known CPUs attempt to predict ahead the outcome of branch instructions and execute down the code path speculatively. Execution time is reduced if the speculation is correct; the success of this speculation, however, is data dependent. Other state-of-the-art CPUs attempt to increase performance by employing simultaneous multithreading (SMT) and/or multi-core chip multiprocessing (CMP). To take advantage of these, changes have to be made at the application or DBMS source code to manually create the process/thread parallelism for the SMT or CMP CPUs. This is generally considered highly as very complex to implement and not always applicable to general purpose CPUs because it is workload dependent.

Unfortunately, general purpose CPUs are not efficient for database applications. Branch prediction is generally not accurate because database processing involves tree traversing and link list or pointer chasing that is very data dependent. Known CPUs employ the well-known instruction-flow (or Von Neumann) architecture, which uses a highly pipelined instruction flow (rather than a data-flow where operand data is pipelined) to operate on data stored in the CPUs tiny register files. Real database workloads, however, typically require processing Gigabytes to Terabytes of data, which overwhelms these tiny registers with loads and reloads. On-chip cache of a general purpose CPU is not effective since it's relatively too small for real database workloads. This requires that the database server frequently retrieve data from its relatively small memory or long latency disk storage. Accordingly, known database servers rely heavily on squeezing the utilization of their small system memory size and disk input/output (I/O) bandwidth. Those skilled in the art recognize that these bottlenecks between storage I/O, the CPU, and memory are very significant performance factors.

However, overcoming the bottlenecks between storage I/O, the CPU, and memory (noted above) can be very complex because typical database systems consist of several layers of hardware, software, etc., that influence the overall performance of the system. These layers comprise, for example, the application software, the DBMS software, operating system (OS), server processor systems, such as its CPU, memory, and disk I/O and infrastructure. Traditionally, performance has been optimized in a database system "horizontally," i.e., within a particular layer. For example, many solutions attempt to optimize various solutions for the DBMS query processing, caching, the disk I/O, etc. These solutions employ a generic, narrow approach that still fails to truly optimize the large performance potentials of the database system, especially for relational database systems having complex read-intensive applications.

Accordingly, it would be very desirable and useful to provide improved database solutions.

SUMMARY

Broadly speaking, the invention relates to computing environments and systems. More particularly, the invention relates to techniques for providing memory sub-channels for computing environments and systems.

In accordance with one aspect of the invention, data can be stored in a memory for in-memory processing system such the data is available for processing as soon as it is needed to be processed. By way of example, first portion and a second portion of the data can be stored in the memory of the in-memory processing system for processing by the in-memory processing system, such that the second portion of the data is stored in the memory before the in-memory processing system completes the processing of the first portion of the data, thereby allowing the in-memory processing system to process the second portion of the data when the processing system is able to process the second portion of the data. Those skilled in the art will appreciate that this processing can, for example, be achieved by providing an execution plan that includes one or more components configured to faceplate storing data in the memory of an in-memory processing system, such the data is available for processing as soon as it is needed to be processed by the in-memory processing system. This processing can be achieved without using a paging system.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

As noted in the background section, improved database solutions would be highly useful.

More recently, in-memory processing systems have been developed. In particular, a high-performance in-memory processing system can provide an in-memory data processing engine using hardware accelerators that may requires data to be memory resident (possibly with exceptions to sequential data reads/writes. or possibly a slow fallback path to perform on top of a paging system).

However, traditional approaches to in-memory engines can scale out such engines to handle data possibly beyond the size of available memory. This means that the traditional approaches use some forms of a paging system to bring data on demand in or out of memory and from or to an external storage (e.g., an external storage (e.g. Hard Disk Drive (HDD). However, this approach, with the overhead of managing the paging system can greatly reduce the overall performance of in-line memory processing systems even when data actually fits in the memory of the in-memory processing systems. Moreover, when data is not does not fit into the memory and as such cannot be stored fully in the memory, the on-demand paging typically leads to orders of magnitude degradation in performance due to the long latency of associated with accessing external storages.

Accordingly, improved techniques for management of memory of in-memory processing systems are needed.

As such, it will be appreciated that data can be stored in a memory for in-memory processing system such the data is available for processing as soon as it is needed to be processed in accordance with one aspect. By way of example, first portion and a second portion of the data can be stored in the memory of the in-memory processing system for processing by the in-memory processing system, such that the second portion of the data is stored in the memory before the in-memory processing system completes the processing of the first portion of the data, thereby allowing the in-memory processing system to process the second portion of the data when the processing system is able to process the second portion of the data. Those skilled in the art will appreciate that this processing can, for example, be achieved by providing an execution plan that includes one or more components configured to faceplate storing data in the memory of an in-memory processing system, such the data is available for processing as soon as it is needed to be processed by the in-memory processing system. This processing can be achieved without using a paging system.

Embodiments of these aspects of the invention are also discussed below with reference to FIGS. 1-12. However, those skilled in the art will readily appreciate that the detailed description given herein with respect to these figures is for explanatory purposes as the invention extends beyond these limited embodiments.

Figure 1:
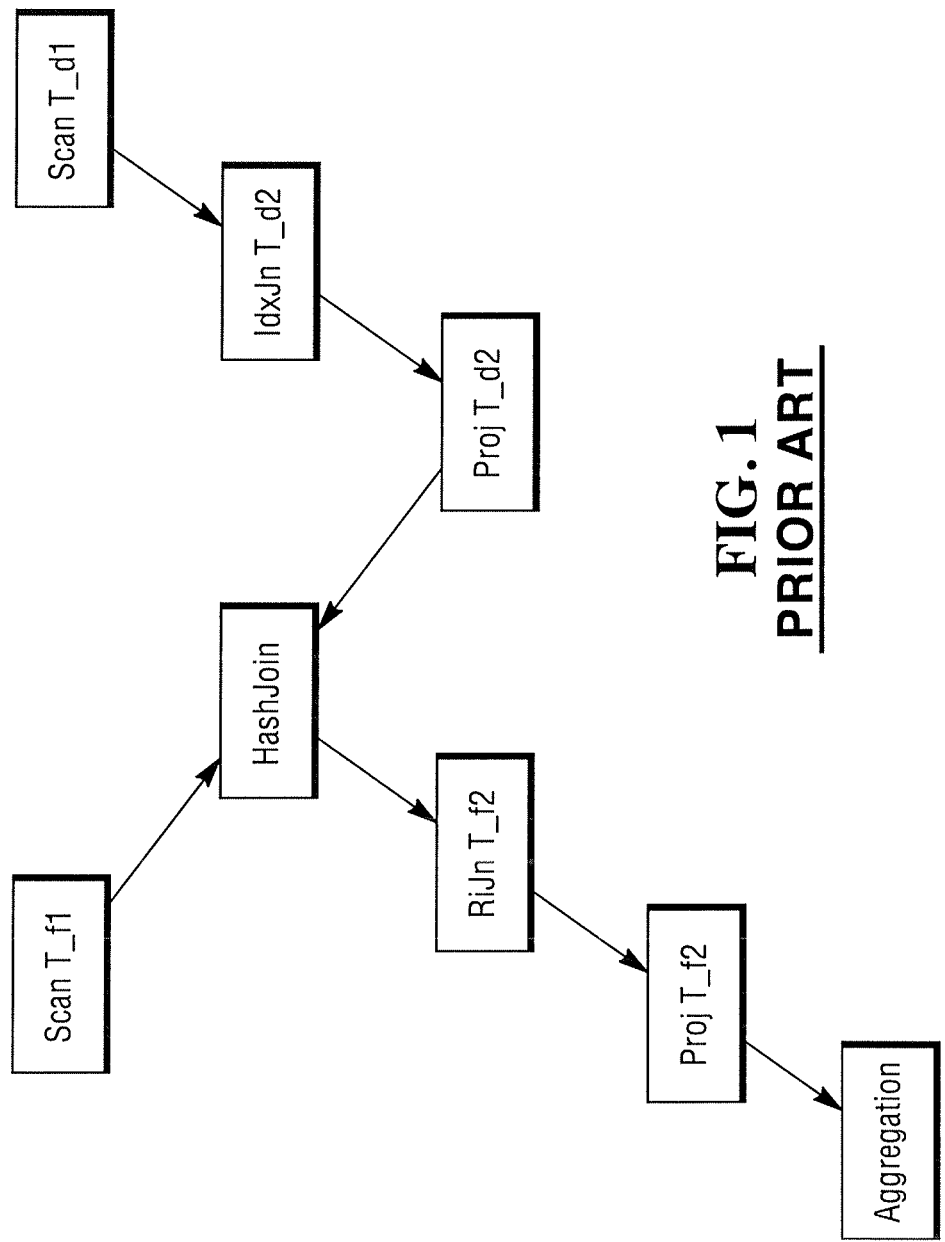
FIG. 1 depicts an execution plan.

To further elaborate, FIG. 1 depicts an execution plan. A compiler/optimizer can take a data processing request (e.g., a SQL statement) and generate the physical execution plan (e.g., a DAG of PhysPlanExpr's) shown in FIG. 1. The DAG of PhysPlanExpr's can then be used to instantiate a DAG of runtime operators (ROP), for example, as a RunUnit. In this context each ROP can typically correspond to a PhysPlanExpr in a straightforward way but can also encapsulate additionally among others things: functions of code for its execution, runtime data structures for data access (e.g., tables and/or indexes), runtime data structures for access of intermediate data. The intermediate data produced by a ROP can be exchanged among ROPs through some form of Inter-ROP-Connects (IRC), which may queue and/or stage the data in memory and/or through an external storage.

Figure 2:
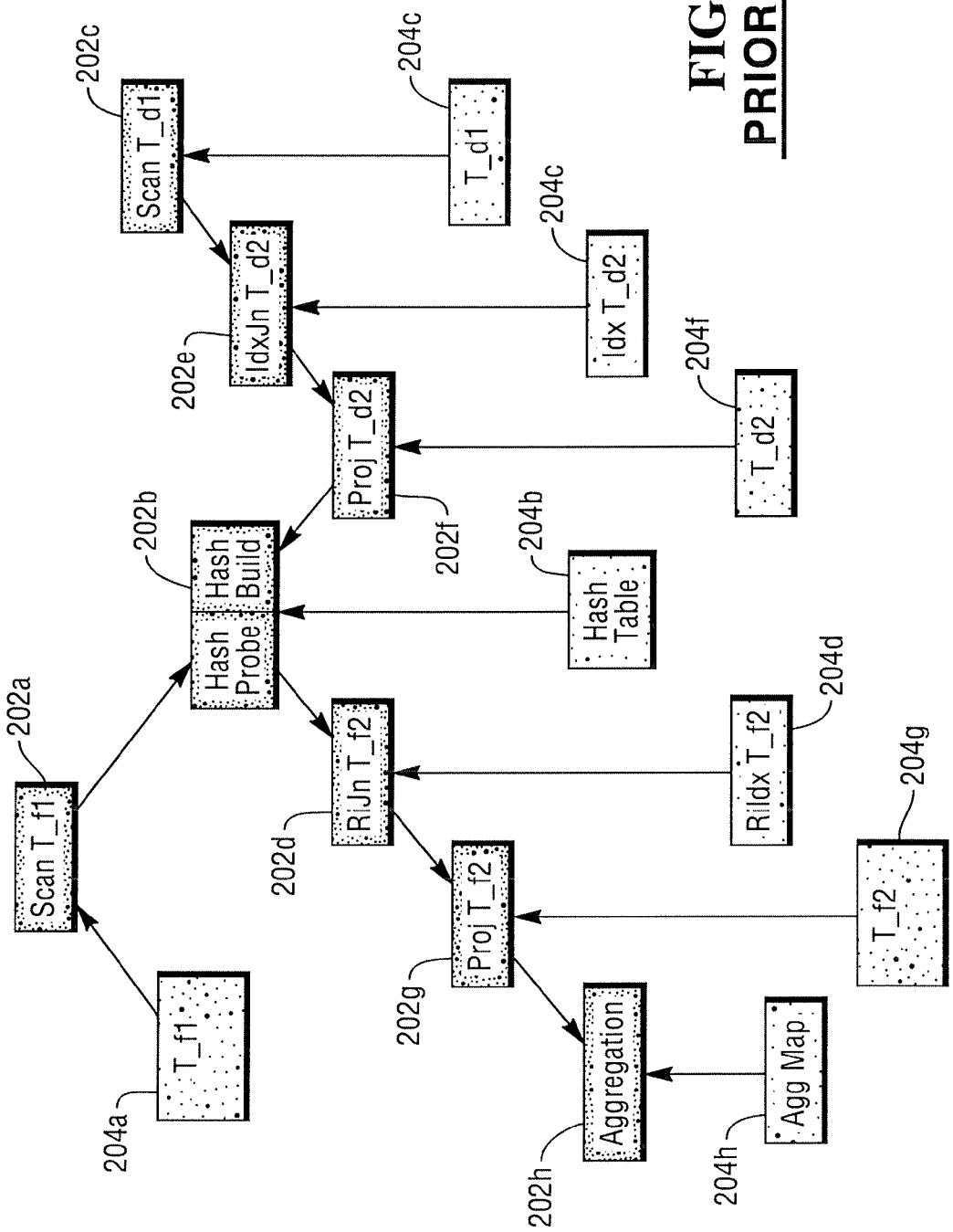
FIG. 2 depicts a RunUnit, a DAG of ROPs with IRCs and associated data for access/processing.

FIG. 2 depicts a RunUnit, a DAG of ROPs 202 with IRCs and associated data 204 for access/processing. Referring to FIG. 2, a DAG of ROP 202a is depicted with an IRC arrow connecting its associated data 204a, and so on.

Figure 3:
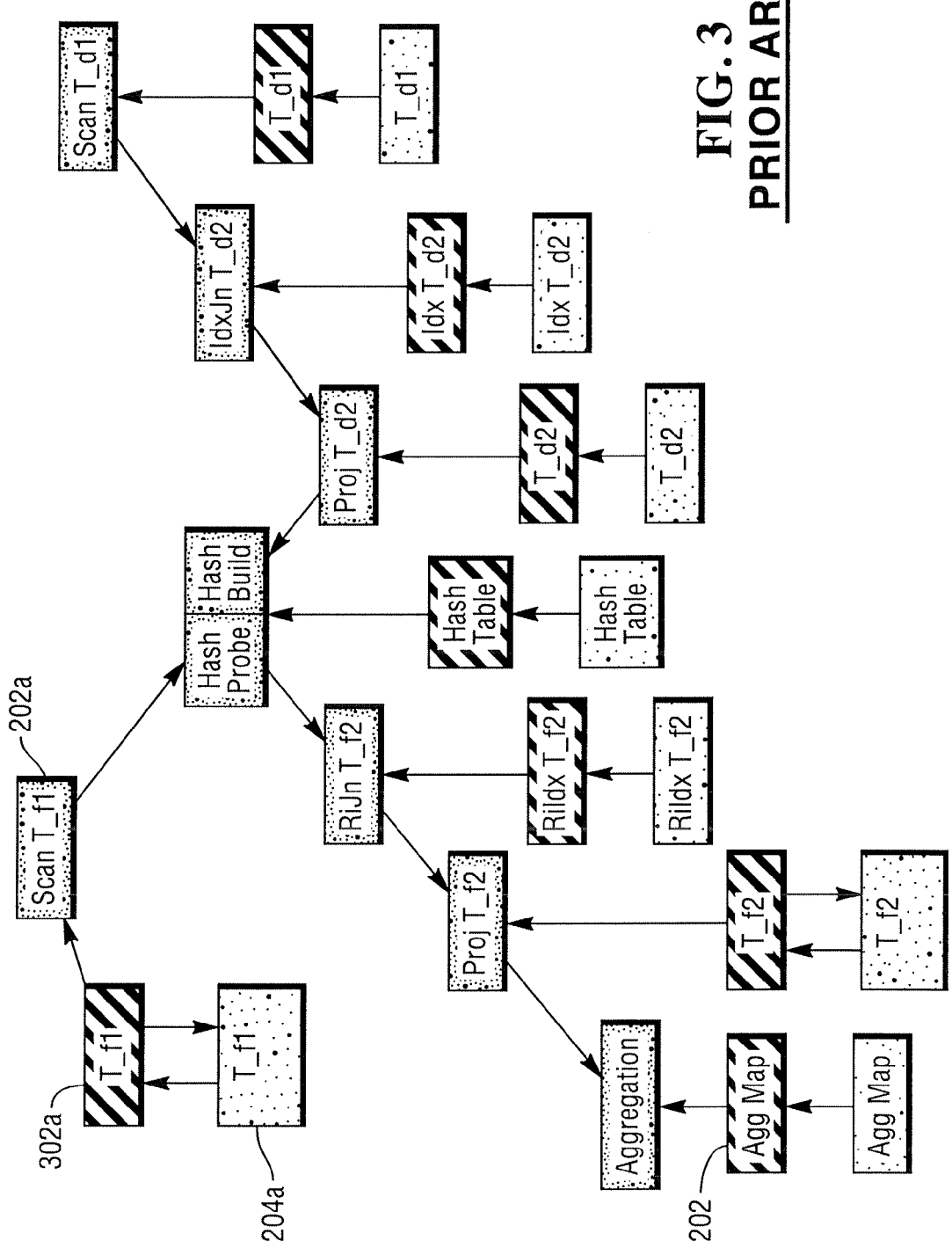
FIG. 3 depicts a paging system provided for the DAG of ROPs and associated data.

FIG. 3 depicts a paging system 302 provided for the DAG of ROPs 202 and associated data 204 (also shown in FIG. 2). Referring to FIG. 3, a part of the paging system 302a effectively pages a portion of the data 204 into memory of an in-memory processing system when the data 204 is too large to be held in its entirety in the memory. It should be noted that paging system 302a generally pages data in and out of the memory as the need for data becomes apparent. As a result, there can be a significant amount of delay associated with the paging system including, for example, the time needed to access data from an external storage in order to copy the data into memory of an in-memory processing system. This means that the in-memory processing system or the execution engine may have to wait for data to be loaded into memory.

In contrast, it will be appreciated that data can be loaded or preloaded in the memory of an in-memory processing system so that it is available for processing by the in-memory processing system as soon as the in-memory processing system is able to process the data in accordance with one aspect of the invention. As such, a first portion of the data can be stored in memory for processing by the in-memory processing system, but before the in-memory processing system completes the processing of the first portion of the data, a second portion of the data can also be stored in the memory of the in-memory processing system for processing by the in-memory processing system in accordance with aspect of the invention, thereby allowing the in-memory processing system to process the second portion of the data when the processing system is able to process the second portion of the data.

Figure 4A:
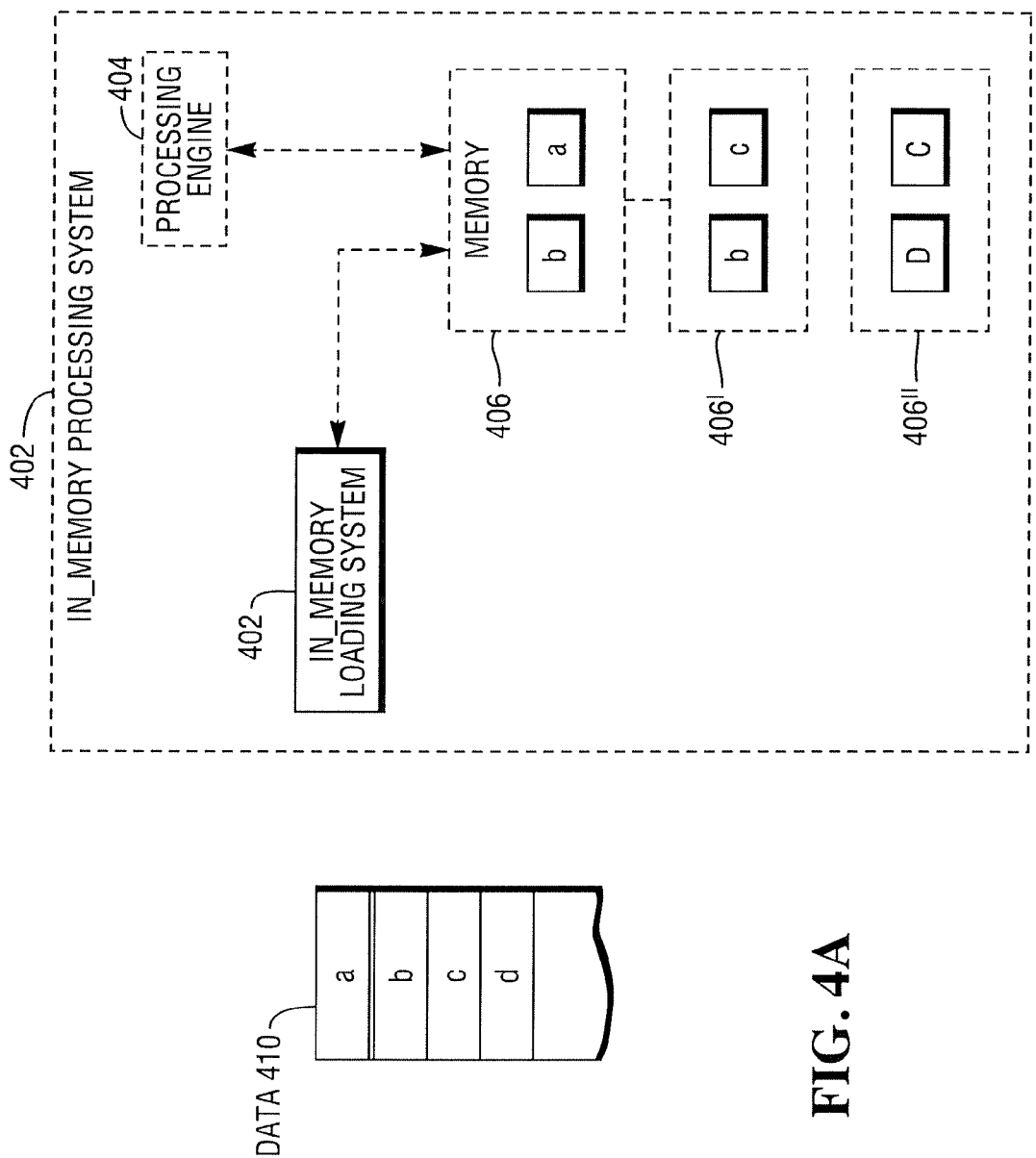
FIG. 4A depicts in-memory loading system in accordance with one embodiment.

To further elaborate, FIG. 4A depicts in-memory loading system 402 in accordance with one embodiment. As suggested by FIG. 4A, the in-memory loading system 402 can, for example, be part of an in-memory processing system 400 that also includes a processing engine (or engine) 404 configured to process data in a memory 406 of the in-memory loading system 402. Of course, the in-memory loading system 402 can be provided as a separate entity, for example, as excutable computer code, as those skilled in the art will readily appreciate.

Referring to FIG. 4A, the in-memory loading system 402 can effectively pipeline the data 410 for processing by the processing engine (or engine) 404. In other words, the in-memory loading system 402 can store first and second portions (or parts) of the data 410 (410A and 410B) in the memory 406 in a manner that the second data portion (410B) is available for processing by the processing engine 404 when the processing engine 404 is ready for processing the second data portion (410B). When the processing by the processing engine 404 has completed processing the first data portion 410A, the in-memory loading system 402 can store the third data portion 410C, for example, by writing over the first data portion 410A. In a similar manner, the in-memory loading system 402 can store a fourth data portion 410D into the memory 406 so that it can be available for processing by the processing engine 404, thereby allowing data 410 be processed without unnecessarily interruption in a pipelined manner. FIG. 4A depicts the memory 406 at different times where various portions of the data 410 are processed in sequential manner (i.e, initially, the first portion of data 410A is processed, then the second portion of the data 410B is processed before the third portion of the data 410C is processed, and so on.

Figure 4B:
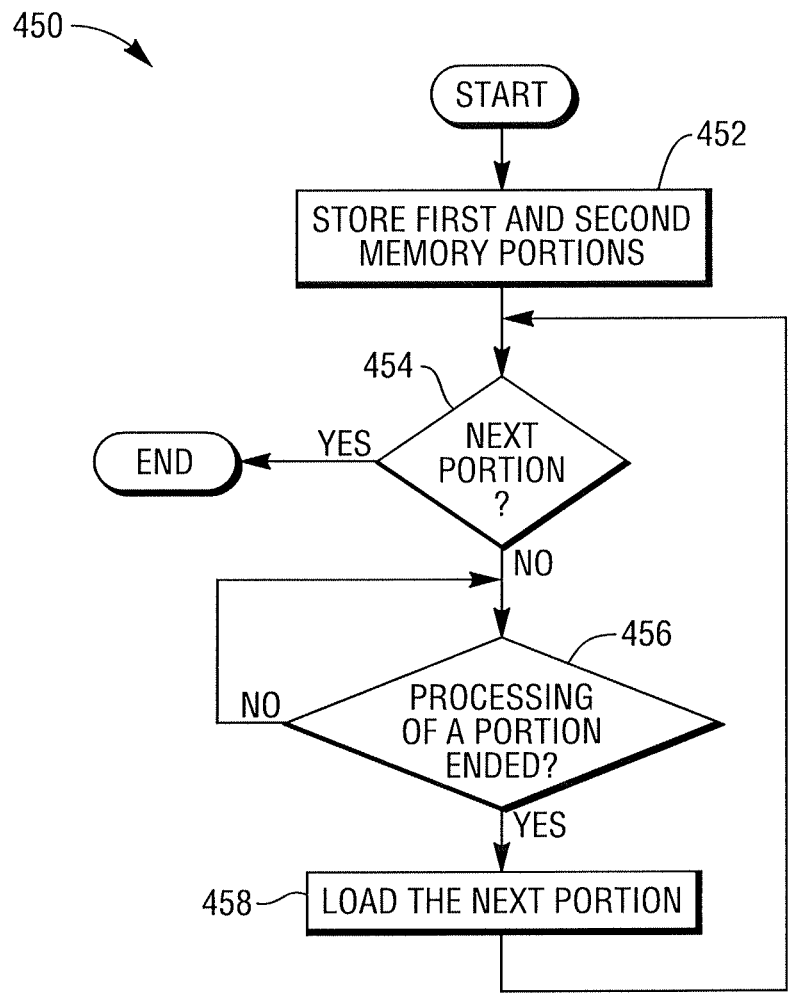
FIG. 4B depicts a method for processing data in an in-memory processing system in accordance with one embodiment.

To elaborate even further, FIG. 4B depicts a method 450 for processing data in an in-memory processing system in accordance with one embodiment. It should be noted that the in-memory processing system can obtain the data from its memory for processing of the data. However, the data cab be larger than the first size of the memory of the in-memory processing system. Method 450 can, for example, be performed by the in-memory loading system 402 (shown in FIG. 4A).

Referring to FIG. 4B, a first and second portions of the data are stored (452) in the memory of the in-memory processing system for processing by the in-memory processing system. The first and second portions can, for example, be stored at the same time, or at different times with the first portion or possibly the second portion of the data being stored first. However, the second portion of the data is stored in the memory of the in-memory processing system, for processing by the in-memory processing system, before the in-memory processing system completes the processing of the first portion of the data, thereby allowing the in-memory processing system to process the second portion of the data when the processing system is able to process the second portion of the data. It should be noted that an indication (e.g., address where data has been stored) can also be provided, for example, to a processing engine. The indication(s) can effectively indicate that a particular portion of data has been stored in particular portion of the memory 406. Thereafter, it can be determined (454) whether there is a another portion of data (e.g., a third portion) that needs to be proceed. Accordingly, a next portion (e.g., a third portion) of the data can be loaded (458) into the memory if it is determined (456) that the processing of a portion of the data previously stored in memory (e.g., a first portion) has been completed. In other words, the next portion of data (e.g., a third portion) can be loaded by replacing or overwriting a portion of the data that has been already processed (e.g., a first portion) before the processing of its immediate preceeding portion of the data (e.g., second portion) has completed, thereby allowing the data to be processed in a pipeline manner. Method 450 can end when it is determined (454) that there are no more data portions to process.

Figure 5:
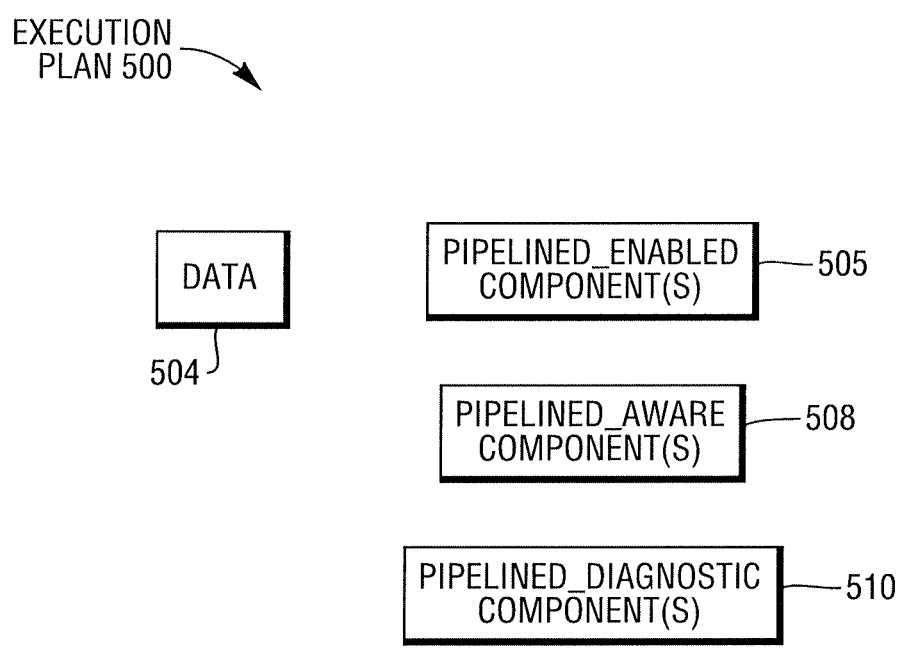
FIG. 5 depicts an execution plan including a pipeline-enabled component or Pipelined Operator (POP) in accordance with one embodiment.

Those skilled in the art will appreciate that the in-memory loading system 402 (shown in FIG. 4A) can, for example, be provided in the context of physical execution plan in accordance with one embodiment of the invention. To further elaborate, FIG. 5 depicts an execution plan 500 including a pipeline-enabled component or Pipelined Operator (POP) 505 in accordance with one embodiment. Referring to FIG. 5, it should be noted that the as a pipeline-enabled component, the Pipelined Operator (POP) 505 can directly load data 504 into memory of an in-memory processing system without the need for a paging system in contrast to the convention systems. Moreover, the pipeline-enabled Pipelined Operator (POP) 505 can load data 506 into the memory of in-memory processing system for processing in pipelined manner similar to the in-memory loading system 402. In other words, the pipeline-enabled POP 505 can be provided with intelligence or programmed logic to load the data 506 in a pipelined manner or processing in a pipelined manner (i.e., to drive pipelined execution of data in an in-memory processing system). Of Course, an execution plan can have multiple pipeline-enabled POP's 505.

Referring to FIG. 5, it should also be noted that a pipelined-aware Pipelined Operator 508 can also be provided to interact with the pipeline-enabled Pipelined Operator (POP) 505. Of course, there can be multiple instances of the pipelined-aware Pipelined Operator 508. For example, multiple instances of the pipelined-aware Pipelined Operator 508 can be served by a single common POP implementation. In addition, there can be one or more operators 510 in the execution plan that are neither pipelined-enabled (i.e., effectively drive the pipelined execution) nor pipelined-aware (i.e., can effectively interact with one or more pipelined-enabled components. As such, more operators 510 can be pipelined-agnostic components that can, for example, be provided as conventional components of a physical execution plan.

Figure 6:
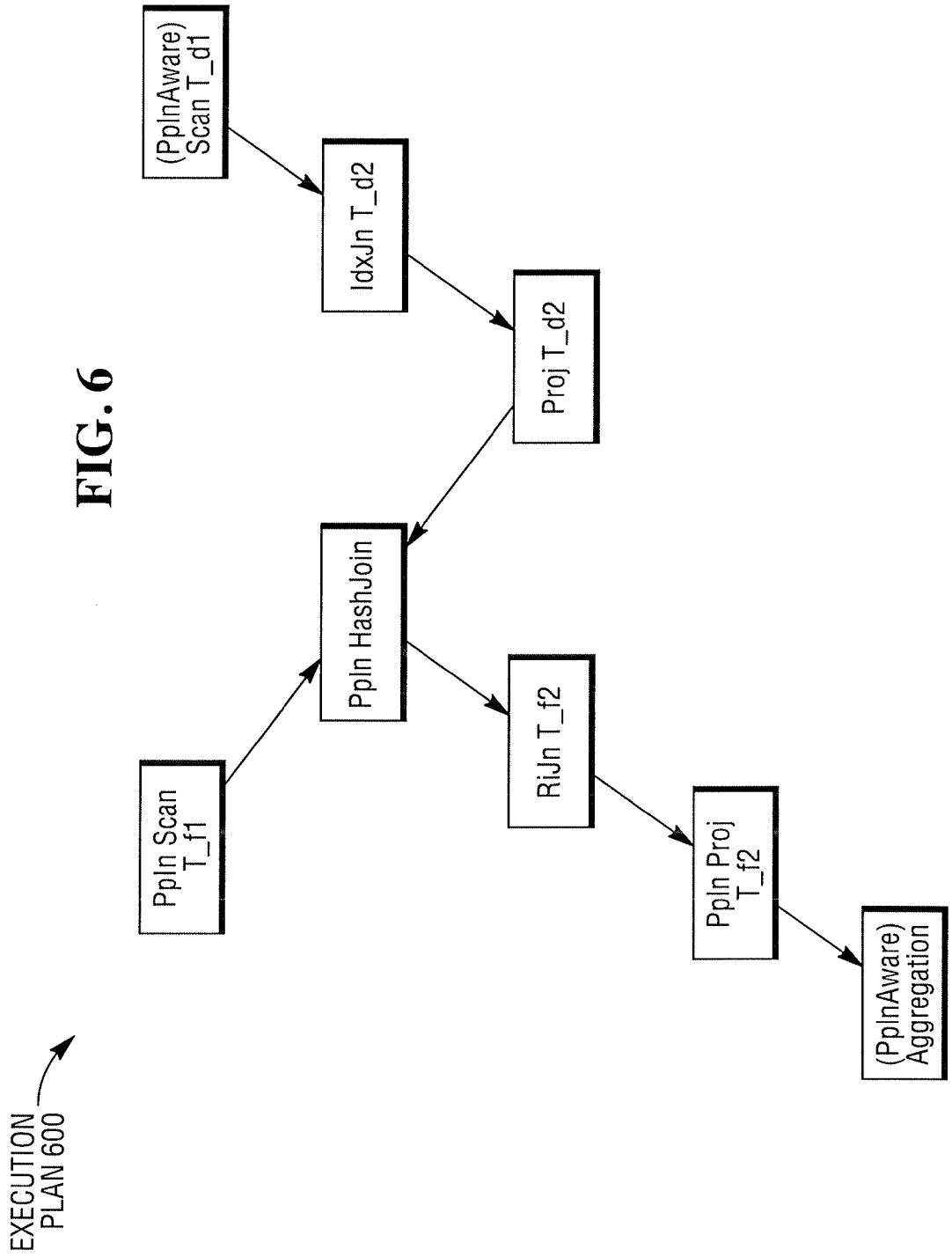
FIG. 6 depicts an exemplary execution plan with pipelining enabled and pipelining aware components in accordance with one embodiment.

To elaborate even further, FIG. 6 depicts an exemplary execution plan 600 with pipelining enabled and pipelining aware components in accordance with one embodiment. It will be appreciated that the exemplary execution plan 600 corresponds to the example of a convention execution plan shown in FIGS. 1, 2 and 3. Specifically, in contrast to convention "S-scan T-f1" operator shown in FIG. 1, a pipeline-enabled operator, namely, "PpIn Scan T f1" can be provided as shown in FIG. 6. Similarly, a "PpIn HashJoin" can be provided as a pipeline-enabled operator to effectively replace a conventional "HashJoin" operator (shown in FIG. 1) and so on. In addition, a Pipeline-aware component, namely, "PpInAware Scan T d1) can be provided while other operators (e.g., "proj T-d2) can remain virtually unchanged and unaware of piplining design of the Pipeline-enabled and Pipeline-aware components.

Figure 7:
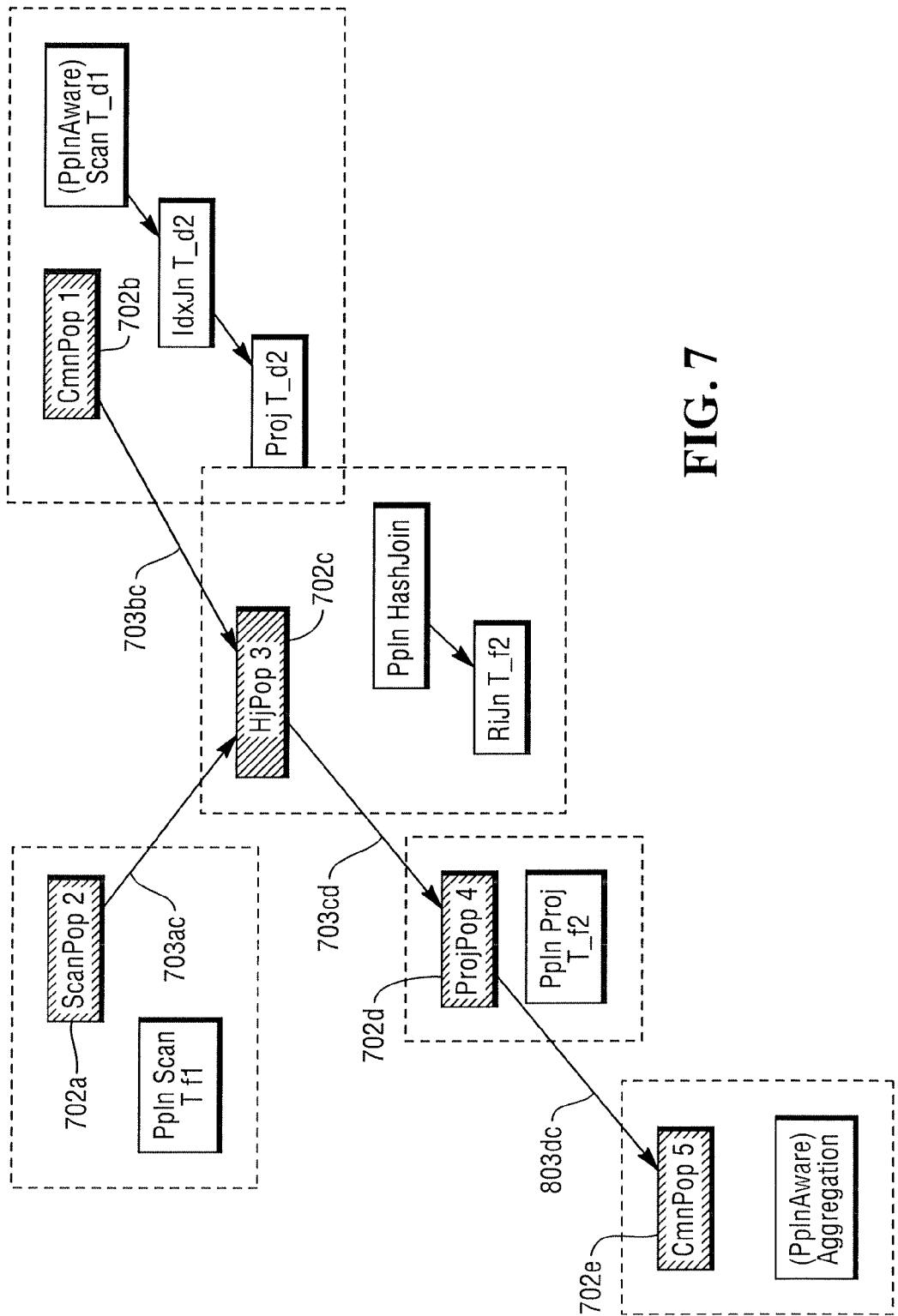
FIG. 7 depicts a PopGraph in accordance with one embodiment.

FIG. 7 depicts a PopGraph 700 in accordance with one embodiment. Referring to FIG. 7, POPs 702 and their corresponding IPopCs 703 are depicted. Physical plan fragments associated with Pops as depicted with dotted lines. Pipelined execution can start when the Pop Graph 700 has been obtained.

Those skilled in the art will appreciate that a new phase of execution plan generation can generate a "Pop Graph" in accordance with one embodiment of the invention. For example, a "Pop Graph" can be provided as a DAG of POPs, each with its own associated plan fragment as depicted in FIG. 7. In addition, Inter-Pop-Connects (IPopC) can be created as a layer of abstraction over the plain IRCs with additional intelligence for incremental pipelined production and consumption of intermediate data between Pops.

Each POP can dynamically instantiates instances of "RunUnits," typically, from their associated physical execution plan fragments and bind each "RunUnit" instance to data, partial or complete, in memory, including the intermediate data in IPopCs. Then, each "RunUnit" instance can simply run on top of the existing engine, processing data in memory virtually at the top speed. The pops can also effectively orchestrate the prefetching of data needed for the next "RunUnit" instance in parallel with the in-memory execution of the current instance. Assuming there is adequate memory available, each "RunUnit" instance can process a significance amount of data in memory and thus easily amortize out overhead for intelligent analysis that can be employed to maximize the throughput of the external storage when prefetching data, even for non-sequential access. Thus, this framework enables a balanced-bound system to scale and process data beyond its memory size, while allowing it to achieve top speed of in-memory-based processing.

Figure 8:
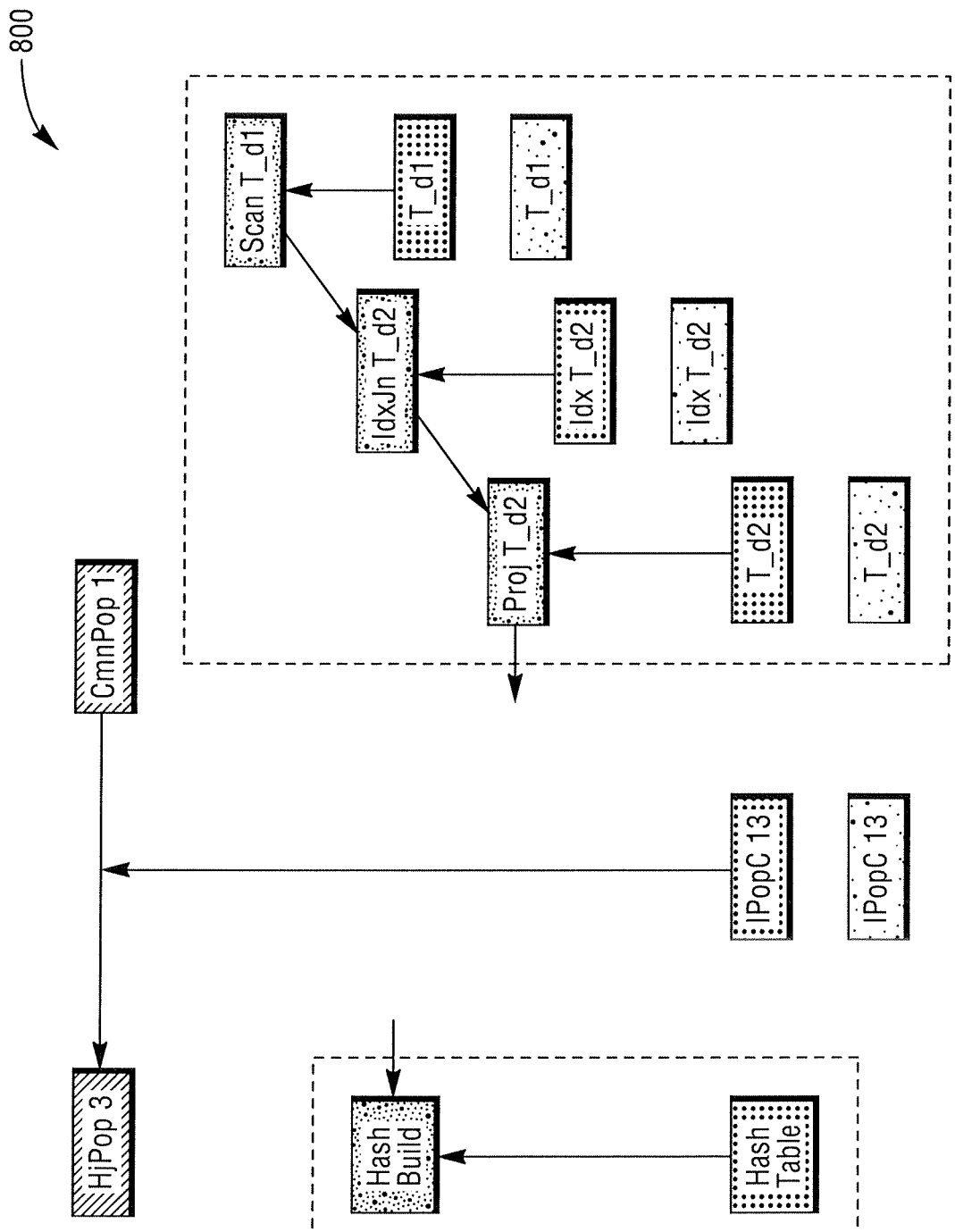
FIGS. 8-11 depicts phases of a Dynamic Pop Execution in accordance with one embodiment.

FIG. 8 depicts a first phase (Phase A) 800 of a Dynamic Pop Execution in accordance with one embodiment. In this step, execution of the "RunUnit" of CmnPop 1 can take place to produce data in "IPopC 13." "HjPop 3" may configure a "RunUnit" to execute just the "HashBuild ROP" in order to consume the data in "IPopC" 13 to build the hash table. It should be noted that "HjPop3" can dynamically execute more than one instance of "HashBuild RunUnit" to produce more than one "HashTable," if the data in IPopC 13 is determined to be larger than the size configured to fit into memory and/or the size of the memory used for in-memory processing.

Figure 9:
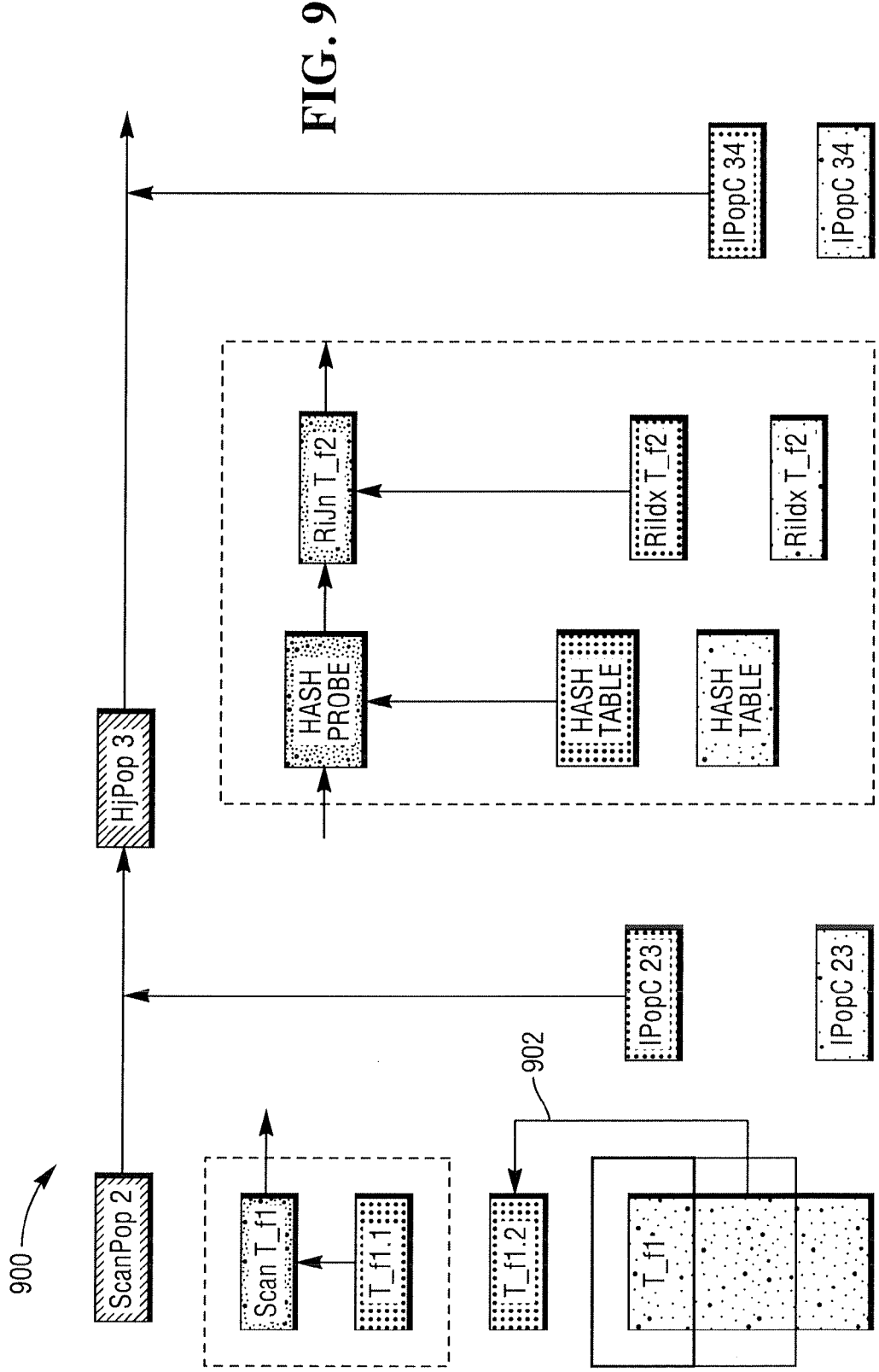

FIG. 9 depicts a second phase (B1) 900 of a Dynamic Pop Execution in accordance with one embodiment of the invention. This step involves execution of the first instance of the "RunUnit" of "ScanPop 2" bound to the first portion of T_f1 in memory. In parallel to the "RunUnit" execution, prefetching of second portion of T_f1 can take place (shown as arrow 902). As data is produced in "IPopC23," "HjPop" 3 may execute its first "hash probing RunUnit," which includes the "ReverseIndex join ROP." if there are more than one "HashTable," then "HjPop 3" can execute as many "RunUnit" instances as needed, each bound to a different "HashTable" for each portion of intermediate data in "IPopC 23."

Figure 10:
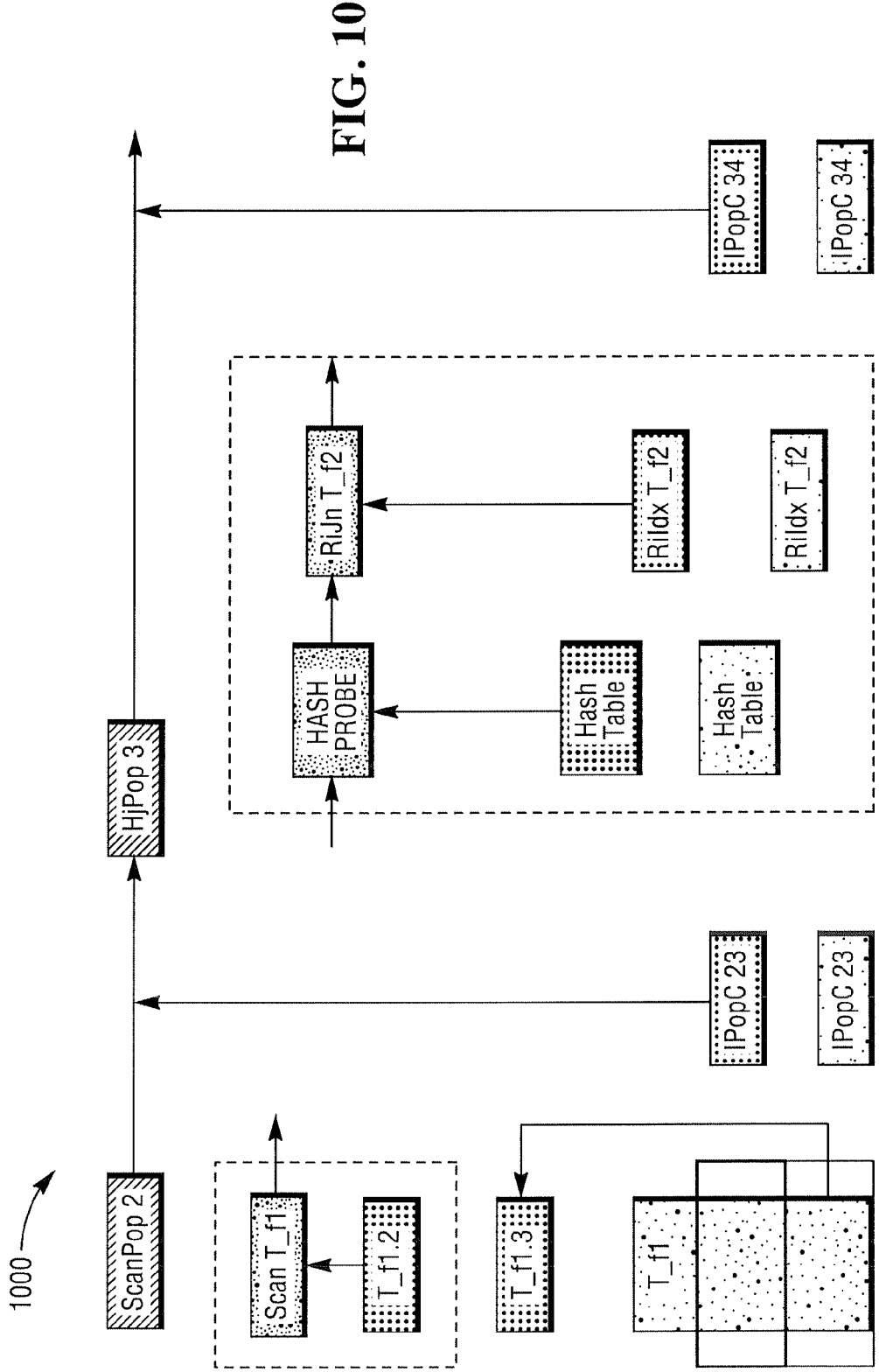

FIG. 10 depicts a third phase (Phase B2) 1000 of a Dynamic Pop Execution in accordance with one embodiment of the invention. This phase involves execution of a second instance of the "RunUnit of ScanPop 2" bound to the second portion of "T_f1" in the memory of the in-memory processing system, where in parallel to the "RunUnit" execution, a third portion of "T_f1" can be perfected into the memory of the in-memory processing system. As data is produced in "IPopC23," "HjPop 3" may execute its second "hash probing RunUnit" that includes the "ReverseIndex join ROP." The POPs can iterate until all the data of "T_f1" has been proceed.

Figure 11:
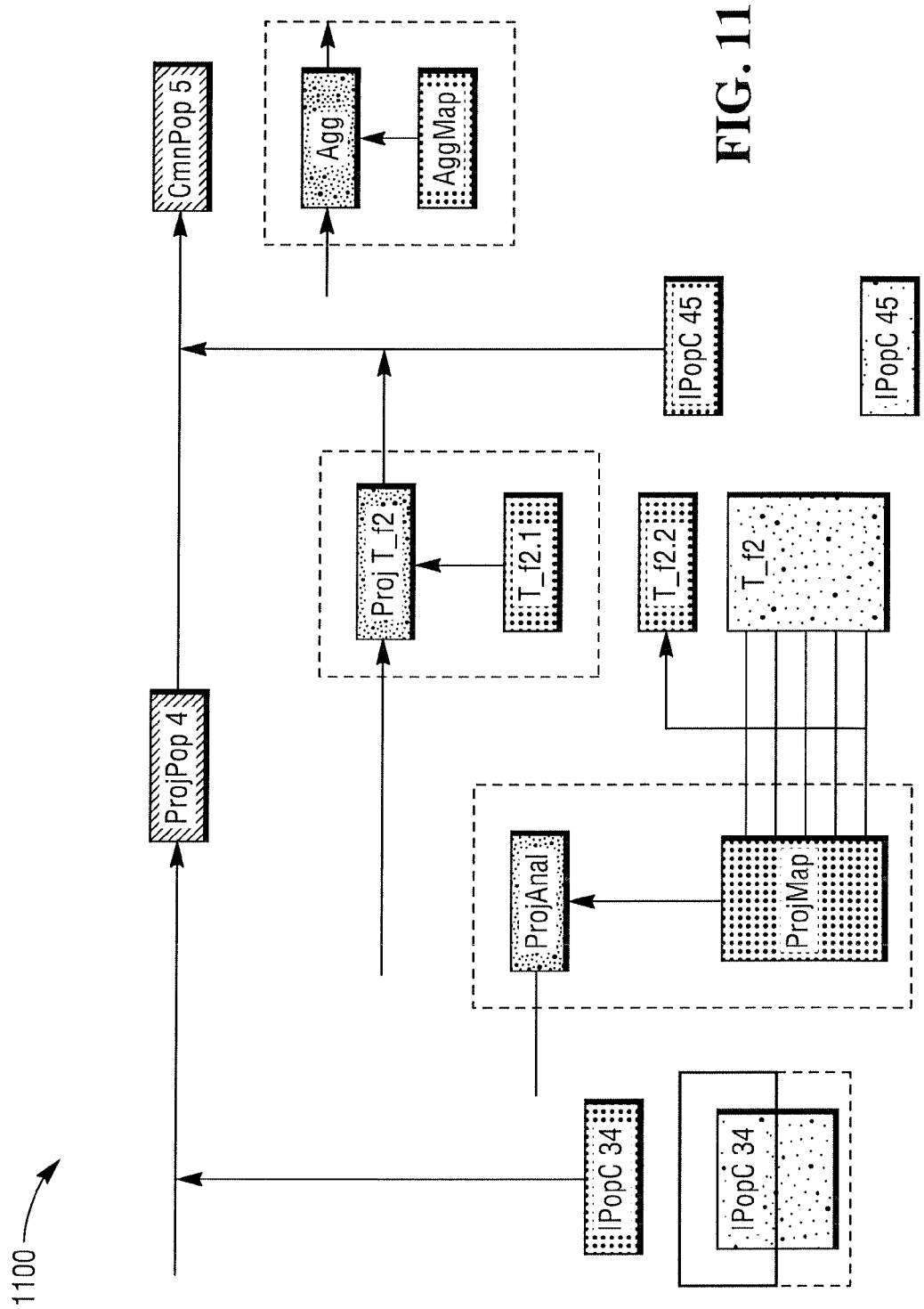

FIG. 11 depicts a fourth phase (Phase C) 1100 of a Dynamic Pop Execution in accordance with one embodiment of the invention. This phase "ProjPop 4" may choose to consume the input data in "IPopC 34" in portions independent of how they are produced by "HjPop 3." As the first portion of data is produced in "IPopC 34," "ProjPop 4" may dynamically form a "projection analysis RunUnit" to, for example, compute a bitmap of blocks in "T_f2" needed for the projection corresponding to the data in that portion of "IPopC 34." It can then, for example, initiate high-bandwidth bulk scatter reads to pre-fetch the relevant data from "T_f2" into the memory buffer "T_f2.1" and execute the first instance of its "RunUnit" that performs the in-memory projection. In parallel, it also analyzes and pre-fetches data for the next portion of "IPopC 34".

Figure 12:
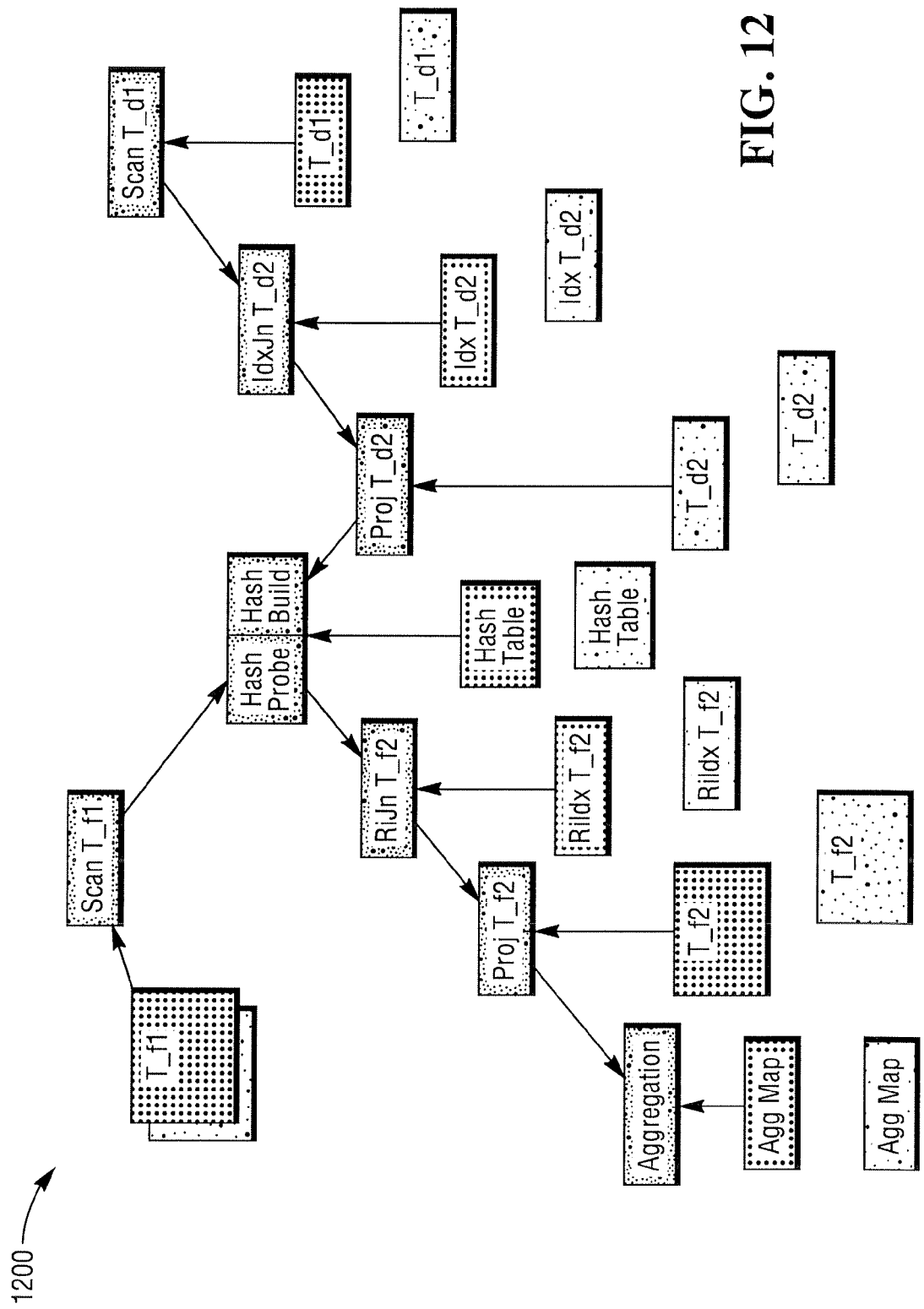
FIG. 12 depicts processing of the data in in-memory processing system in accordance with one embodiment.

FIG. 12 depicts processing of the data (1200) in in-memory processing system in accordance with one embodiment. Referring to FIG. 12, the processing of the data (1200) can be contrasted with a convention approach depicted in FIG. 3 utilizing a paging system for managing memory in an in-memory processing system. In contrast to the conventional system depicted in FIG. 3 which can have a high overhead for a paging system even when data fits into memory, the processing of the data (1200) can be performed without the cost or overhead associated with a paging system. Also, the processing of the data (1200) can accommodate situations of Data ("T-f1," "T_f2) is much larger than the size of the memory used in the in-memory processing system. The processing of the data (1200) can also accommodate when data is dynamically generated (e.g., Hash table). The processing of the data 1200 can further accommodate situations when large intermediate data may need to stage to external storage that can be written out and read back in a sequentially in an efficient manner.

It should also be noted that techniques noted above are useful for various memory applications, including, for example "in-line memory" applications. "In-line memory" can, for example, be provided, for large database systems, including single or multi-node, parallel database systems. A multi-node parallel database system can, for example, use a massively parallel processing (MPP) architecture or system to perform various database operations in parallel. In-line memory" can, for example, be provided as "coupled memory" for a hardware accelerator. An example of an "In-line memory" application and hardware accelerator is discussed, for example, in the U.S. Pat. No. 7,908,259 entitled: "HARDWARE ACCELERATED RECONFIGURABLE PROCESSOR FOR ACCELERATING DATABASE OPERATIONS AND QUERIES," which is hereby incorporated by references herein in its entirety and for all purposes. U.S. Pat. No. 8,244,718 entitled: "METHODS AND SYSTEMS FOR HARDWARE ACCELERATION OF DATABASE OPERATIONS AND QUERIES," provides an example of systems for hardware acceleration of database operations and queries, which is also hereby incorporated by references herein in its entirety and for all purposes.

Generally, various aspects, features, embodiments or implementations of the invention described above can be used alone or in various combinations. Furthermore, implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, an apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described is this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method, performed at least partly by a device, for processing data in an in-memory processing system that obtains the data from its memory of a first size for the processing of the data, wherein the data has a size that is larger than the first size of the memory of the in-memory processing system, and wherein the method comprises:
   storing a first portion and a second portion of the data in the memory of the in-memory processing system for processing by the in-memory processing system;
   wherein the storing of the second portion of the data stores the second portion of the data in the memory of the in-memory processing system for processing by the in-memory processing system before the in-memory processing system completes the processing of the first portion of the data, thereby allowing the in-memory processing system to process the second portion of the data when the processing system is able to process the second portion of the data;

generating an execution plan for the processing data by the in-memory processing system, wherein the execution plan includes at least one pipeline-enabled component; storing, by the at least one pipeline-enabled component, the first portion of the data in the memory of the in-memory processing system for processing by the in-memory processing system; and storing, by the at least one pipeline-enabled component, a second portion of the data in the memory of the in-memory processing system for processing by the in-memory processing system before the in-memory processing system completes the processing of the first portion of the data;

generating at least one pipelined-aware execution plan component in the execution plan, wherein the pipelined-aware component is configured to interact with the at least one pipeline-enabled component so that the pipeline-enabled execution plan component can effectively determine, at runtime when the execution plan is executed, to store at least one of the first and second portions of the data in-memory processing system for processing by the in-memory processing system;

wherein the pipelined-aware execution plan component is configured to cause generation of a runtime pipeline operator configured to operate at runtime to allow the in-memory processing system to process data in a pipelined manner; and wherein the runtime pipeline operator includes one or more instances of a scanning runtime operator configured to scan the data.

2. The method of claim 1, wherein the storing of the second portion of the data is performed without having to use memory paging to page the second portion of the data into the memory of the in-memory processing system after the processing of the first portion of the data.

3. The method of claim 1, wherein the runtime pipeline operator is configured to store the first and second portions of data to allow the in-memory processing system to process data in a pipelined manner.

4. The method of claim 1, wherein the runtime pipeline operator includes one or more instances of a join runtime operator configured to perform one or more join operation on the data.

5. The method of claim 1, wherein the runtime pipeline operator includes one or more instances of a projection runtime operator configured to perform one or more projection operations on the data.

6. The method of claim 1, wherein the runtime pipeline operator is configured to process the data independently from the order provided by another runtime operator at runtime when the execution plan is executed.

7. The method of claim 1, wherein the runtime pipeline operator is configured to compute a mapping for the data so that the data can be obtained the data based on the mapping in a sequential manner.

8. An in-memory processing system that includes: a memory of a first size; and one or more processors adapted to: obtain data from the memory of the first size for the processing of the data, wherein the data has a size that is larger than the first size of the memory of the in-memory processing system; store a first portion and a second portion of the data in the memory of the in-memory processing system for processing by the in-memory processing system; wherein the storing of the second portion of the data stores the second portion of the data in the memory of the in-memory processing system for processing by the in-memory processing system before the in-memory processing system completes the processing of the first portion of the data, thereby allowing the in-memory processing system to process the second portion of the data when the processing system is able to process the second portion of the data; generate an execution plan for the processing data by the in-memory processing system, wherein the execution plan includes at least one pipeline-enabled component that: stores the first portion of the data in the memory of the in-memory processing system for processing by the in-memory processing system; and stores a second portion of the data in the memory of the in-memory processing system for processing by the in-memory processing system before the in-memory processing system completes the processing of the first portion of the data; generate at least one pipelined-aware execution plan component in the execution plan, wherein the pipelined-aware component is configured to interact with the at least one pipeline-enabled component so that the pipeline-enabled execution plan component can effectively determine, at runtime when the execution plan is executed, to store at least one of the first and second portions of the data in-memory processing system for processing by the in-memory processing system; wherein the pipelined-aware execution plan component is configured to cause generation of a runtime pipeline operator configured to operate at runtime to allow the in-memory processing system to process data in a pipelined mariner; and wherein the runtime pipeline oerator includes one or more instances of a scanning runtime operator configured to scan the data.

9. The in-memory processing system of claim 8, wherein the storing of the second portion of the data is performed without having to use memory paging to page the second portion of the data into the memory of the in-memory processing system after the processing of the first portion of the data.

10. The in-memory processing system of claim 8, wherein the runtime pipeline operator is configured to store the first and second portions of data to allow the in-memory processing system to process data in a pipelined manner.

11. A non-transitory computer-readable storage medium storing at least executable code for processing data in an in-memory processing system that obtains the data from its memory of a first size for the processing of the data, wherein the data has a size that is larger than the first size of the memory of the in-memory processing system, and wherein the executable code when executed: stores a first portion and a second portion of the data in the memory of the in-memory processing system for processing by the in-memory processing system; and wherein the storing of the second portion of the data stores the second portion of the data in the memory of the in-memory processing system for processing by the in-memory processing system before the in-memory processing system completes the processing of the first portion of the data, thereby allowing the in-memory processing system to process the second portion of the data when the processing system is able to process the second portion of the data; generates an execution plan for the processing data by the in-memory processing system, wherein the execution plan includes at least one pipeline-enabled component configured to: store the first portion of the data in the memory of the in-memory processing system for processing by the in-memory processing system; and store a second portion of the data in the memory of the in-memory processing system for processing by the in-memory processing system before the in-memory processing system completes the processing of the first portion of the data; generates at least one pipelined-aware execution plan component in the execution plan, wherein the pipelined-aware component is configured to interact with the at least one pipeline-enabled component so that the pipeline-enabled execution plan component can effectively determine, at runtime when the execution plan is executed, to store at least one of the first and second portions of the data in-memory processing system for processing by the in-memory processing system; wherein the pipelined-aware execution plan component is configured to cause generation of a runtime pipeline operator configured to operate at runtime to allow the in-memory processing system to process data in a pipelined manner; and wherein the runtime pipeline operator includes one or more instances of a scanning runtime operator configured to scan the data.

12. The non-transitory computer-readable storage medium of claim 11, wherein the storing of the second portion of the data is performed without having to use memory paging to page the second portion of the data into the memory of the in-memory processing system after the processing of the first portion of the data.

* * * * *